H. M. WOODFORD,

Match-Safes.

No. 5,821. Reissued March 31, 1874.

Witnesses.
John Pollitt
Harrison B. Freeman

Inventor.
Henry M. Woodford
By W. E. Simonds
Atty

AM. PHOTO-LITHOGRAPHIC Co. N.Y. (OSBORNE'S PROCESS.)

UNITED STATES PATENT OFFICE.

HENRY M. WOODFORD, OF KENSINGTON, CONNECTICUT.

IMPROVEMENT IN MATCH-SAFES.

Specification forming part of Letters Patent No. 79,426, dated June 30, 1868; reissue No. 5,821, dated March 31, 1874; application filed August 22, 1873.

*To all whom it may concern:*

Be it known that I, HENRY M. WOODFORD, of Kensington, in the county of Hartford and State of Connecticut, have invented certain new and useful Improvements in the Construction of Match-Safes, of which the following is a specification, reference being had to the accompanying drawings, in which—

Figure 1:
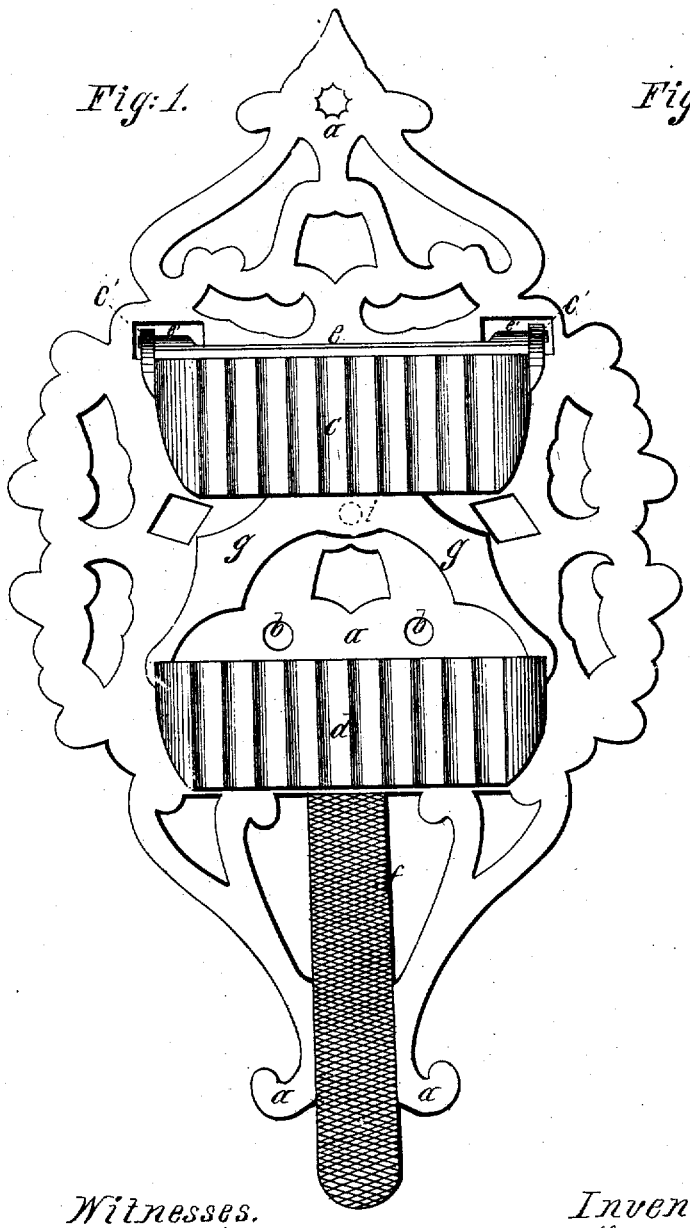
Figure 2:
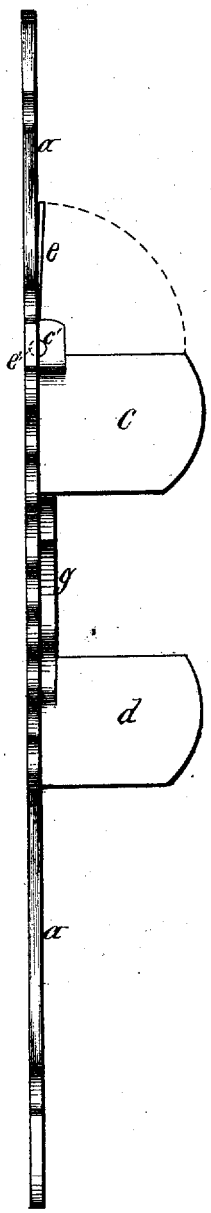

Figure 1 is a face or front view of a match-safe embodying my improvements. Fig. 2 is an edge or side view of the same.

The letter *a* indicates the base-plate or bracket, all in one piece, to which the two boxes and the lid are attached. *b b* are screw-holes for fixing the device to the wall for use. *c* is a match-box. *d* is a box for the waste ends of the matches; *e*, the lid of the match-box, and *f* a friction-surface for igniting the matches. The two boxes are united by the bracket-arms *g*, so that the two boxes and this bracket may be formed or cast all in one piece. The two boxes have no back, but are fastened against the plate *a*, so that this plate forms a back to the boxes. The two boxes *c* and *d* are fastened to the plate *a* by the single rivet *i*.

This device is designed to be hung on a vertical surface, as the side wall of a room. The lid *e* has two bearing or journal pins, *e′ e′*, hung in teats *c′ c′*, projecting upward from the box *c;* and these journal-pins have their bearings practically in the center of the thickness of the plate *a*, and back of the back line of the lid, so that the lid cannot be lifted to a vertical position when the device is hung on a vertical wall, but will strike the plate *a* first, so that this lid will always, by its gravity, fall back and cover the match-box after a person has lifted the lid to take out a match.

It will be seen that, by the method of construction herein described, I am enabled to cast the whole thing in two pieces, and then unite them by a single rivet, the back plate forming the back of both the boxes, thus enabling me to make the safe much cheaper than in any other way. It will also be seen that, by this method of construction, I am enabled to cast the bearings for the journals *e′ e′* partly in the lugs *c′ c′* and partly in the back plate, thus doing away with all necessity for boring and fitting, and thereby so much cheapening the article; and it is these two points only that I desire to cover and claim.

I claim as my invention—

1. The combination of the back plate *a* and the boxes *c d*—one above the other—upon the bracket *g*, united by a rivet, and the back plate forming the back of both the boxes, the whole constructed, arranged, and designed for use substantially as described.

2. In a match-safe, the combination of the box *c*, lugs *c′ c′*, having parti-bearings for the journal-pins *e′ e′*, the lid *e*, journal-pins *e′ e′*, and the back plate *a*, having the other parti-bearings for the journal-pins, the whole constructed, arranged, and designed for operation and use substantially as described.

HENRY M. WOODFORD.

Witnesses:

HENRY MCCLEARY,

ANDREW J. WARNER.